United States Patent [19]
Uemura

[11] 3,711,724
[45] Jan. 16, 1973

[54] SPEED DETECTING DEVICE

[75] Inventor: Saburo Uemura, Kanazawa-ku, Yokohama-shi, Kanagawa-ken, Japan

[73] Assignee: Sony Corporation, Tokyo, Japan

[22] Filed: Jan. 11, 1972

[21] Appl. No.: 216,437

[30] Foreign Application Priority Data

Jan. 19, 1971 Japan ................................. 46/1541

[52] U.S. Cl. .................................. 307/43, 324/165
[51] Int. Cl. ............................................ G01p 13/00
[58] Field of Search ........ 324/165, 174; 307/122, 43; 340/73, 271

[56] References Cited

UNITED STATES PATENTS 3,123,818  3/1964  Steele ........................... 340/271 UX
3,544,842  12/1970  Yampolsky ................... 324/165 UX Primary Examiner—Robert K. Schaefer
Assistant Examiner—M. Ginsburg
Attorney—Lewis H. Eslinger et al.

[57] ABSTRACT

In a device for detecting the speed of a moving member, at least one magnet is coupled to the moving member and has magnetic poles of alternately opposite polarities spaced apart on the magnet in the direction of movement of the latter with the moving member, a generator is associated with the magnet to provide an alternating voltage having its peak magnitude and phase determined by the speed and direction, respectively, of the movement of the magnet, a transformer is excited by a signal, as from an oscillator, and is responsive to magnetic flux from the magnet for producing intermittent control signals at intervals determined by the speed of the magnet movement, and such control signals control a circuit by which the above alternating voltage is sampled at the occurrences of the control signals and a D.C. output voltage is provided corresponding, in its magnitude and polarity, to the speed and direction, respectively, of the magnet movement.

16 Claims, 14 Drawing Figures

PATENTED JAN 16 1973

SPEED DETECTING DEVICE

This invention relates generally to speed detecting devices, and more particularly is directed to a device which is capable of detecting the direction and speed of movement of a moving member.

Tachometers now in use generally employ a rectifier type generator. Since such a rectifier-type generator has brushes, ripples and noises generated by the brushes often introduce inaccuracy in the detection of speed. Further, the maintenance of the brushes is troublesome, and the inclusion of the brushes inevitably leads to bulkiness of the device.

It is also known to employ a frequency-generator as a speed detecting device. The frequency-generator consists of a disc affixed to a rotary member, for example, a rotary shaft of a motor, and magnetized at its marginal portion or periphery with alternately arranged north and south magnetic poles, and comb-like yokes and coils surrounding the disc so that an AC voltage is generated in the coils in response to the rotation of the disc with the frequency of the AC voltage being proportional to the speed of the rotary member. Thus, the rotational speed of the rotary member can be detected by measuring the frequency of the produced AC voltage. Since the frequency-generator used for speed detection does not require any mechanical contact with the rotary member, for example, as by brushes, its useful life is extended, and the need for maintenance is minimized. Further, the generation of sparks or arcing is avoided by the frequency generator, so that other electronic apparatus are not adversely affected thereby. However, when the rotational speed of the rotary member becomes extremely low, increased rippes occur in the generated signal and inaccurate detection of speed results therefrom. Further, the existing frequency generators can detect the rotational speed of the rotary member but cannot detect the direction of such rotation.

Accordingly, an object of this invention is to provide a speed detecting device which is capable of detecting both the speed and direction of movement of a moving member without making physical contact therewith.

Another object is to provide a speed detecting device which is capable of detecting the speed and direction of rotation of a rotary member without arcing or the generation of sparks.

Still another object is to provide a speed detecting device which is capable of indicating the direction of movement of a moving member by the polarity of its output voltage, and which is further capable of indicating the speed of the movement of the moving member by the absolute value of such output voltage.

A further object of this invention is to provide a speed detecting device which is long-lived and easy to handle, and which is inexpensive and simple in construction.

A still further object of this invention is to provide a speed detecting device which is suitable for use in connection with magnetic recording and reproducing apparatus, brushless motors and the like.

In accordance with an aspect of this invention, a device for detecting the speed and direction of movement of a movable member, comprises one or more magnets adapted to be coupled to the movable member for movement with the latter and having a plurality of magnetic poles of opposite polarities arranged alternately in the direction of movement of each magnet with the movable member, alternating voltage generating means responsive to movement of the magnet for generating an alternating voltage having its peak magnitude and phase determined by the speed and direction, respectively, of the magnet movement, a signal generator, for example, in the form of an oscillator, transformer means excited by the signal generator and being responsive to magnetic flux from the associated magnet for producing intermittent control signals at intervals determined by the speed of movement of the magnet, and circuit means controlled by the control signals and receiving said alternating voltage for sampling the latter at the occurrences of said control signals and providing a D.C. output voltage corresponding in its magnitude and polarity to said speed and direction, respectively, of movement of the movable member.

In a preferred embodiment of the invention, the aforesaid transformer means includes a core disposed to receive magnetic flux from the associated magnet and primary and secondary windings on the core which are substantially coupled with each other through said core only when a pole of one of the polarities on the magnet is disposed adjacent the core, and the primary winding is connected with the signal generator and said control signals are produced in the secondary winding in response to the substantial coupling of the latter with the primary winding through the core.

The above, and other objects, features and advantages of the invention, will be apparent in the following detailed description of illustrative embodiments which is to be read in connection with the accompanying drawings, wherein.

Figure 6A:
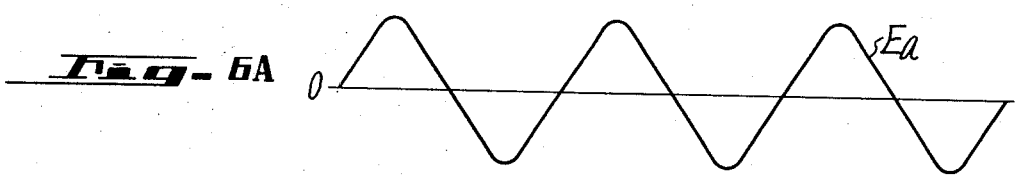
Figure 6B:
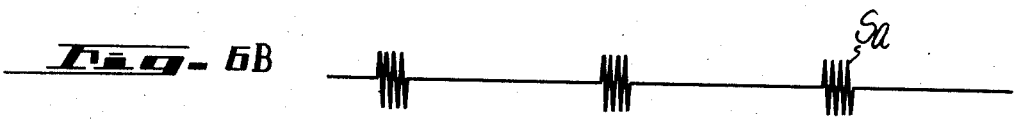
Figure 6C:
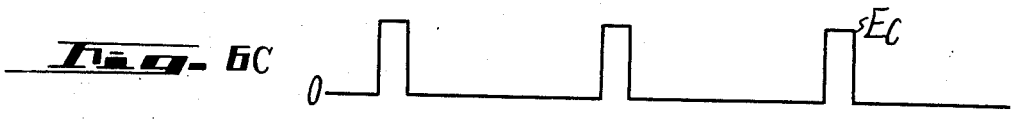
Figure 6D:
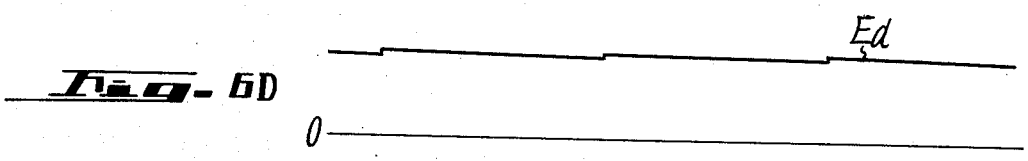
Figure 6A:
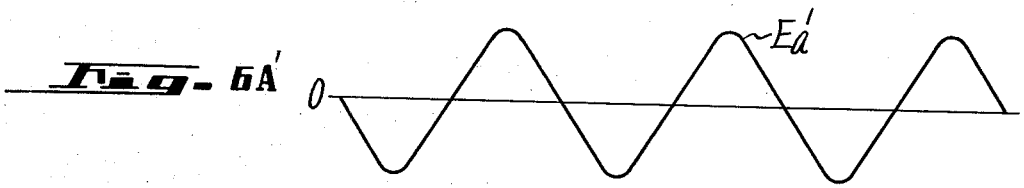
Figure 6B:
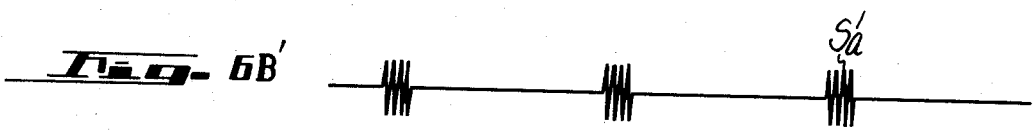
Figure 6C:
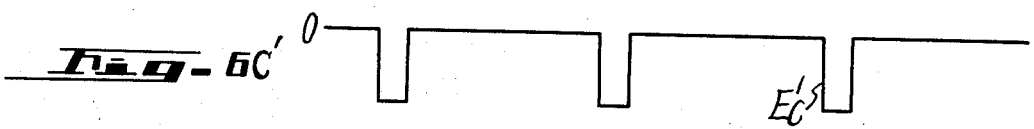
Figure 6D:
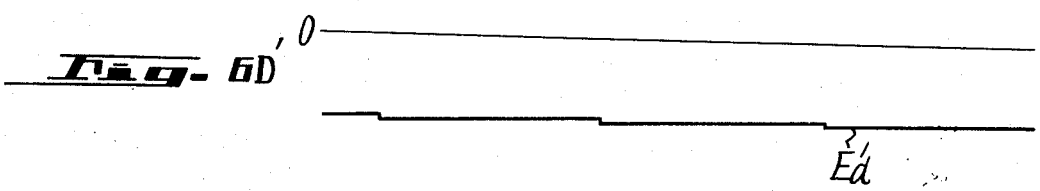
Figure 7:
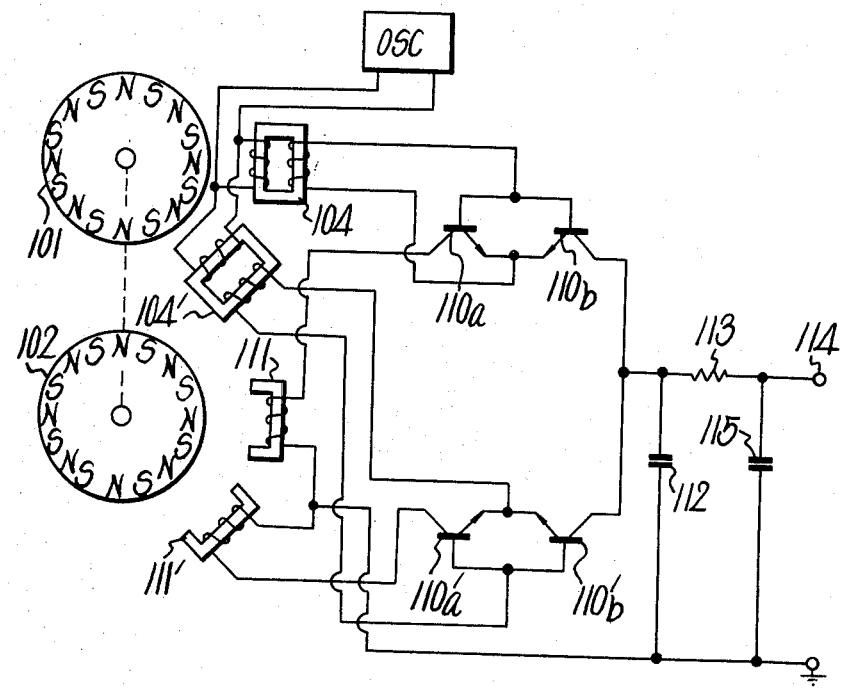

FIGS. 6A–6D and 6A'–6D' are a series of waveform diagrams to which reference will be made in explaining the operation of the device of FIG. 1; and FIG. 7 is a view similar to that of FIG. 1, but showing another embodiment of this invention.

Figure 1:
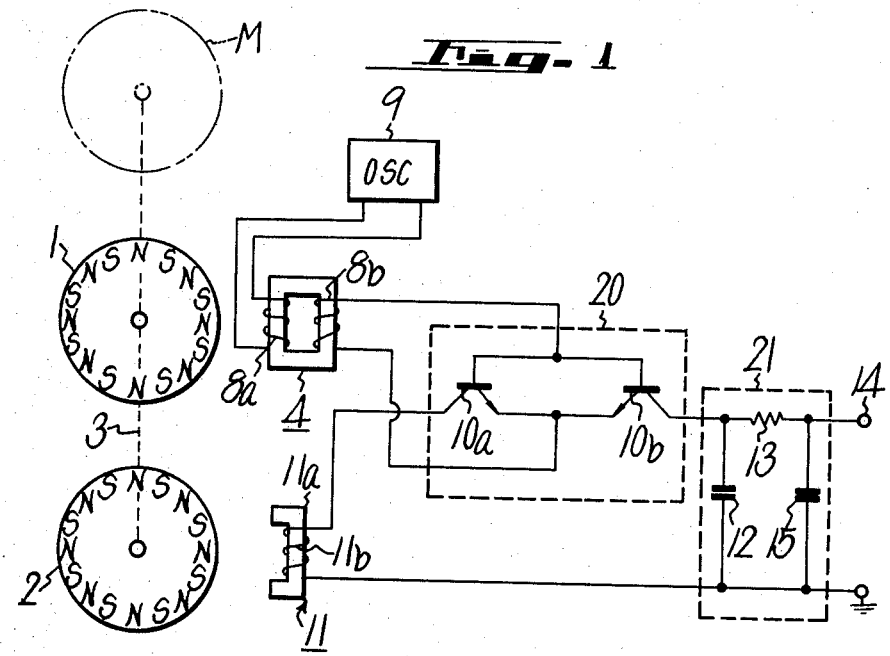
FIG. 1 is a schematic circuit diagram showing one embodiment of a speed detecting device according to this invention.

Referring to the drawings in detail, and initially to FIG. 1, it will be seen that a speed detecting device according to this invention is there shown to include magnet rotors or discs 1 and 2 which are magnetized on the marginal portions or peripheries so as to have, for example, one hundred pairs of north and south magnetic poles at equiangular intervals. The magnet rotors 1 and 2 are affixed to a rotary member 3, for example, the shaft of motor M. Accordingly, the rotational speed and direction of rotation of rotary shaft 3 and of magnet rotors 1 and 2 correspond to the speed and direction of rotation of the motor M. A saturable transformer 4 is provided in opposing relation to the magnet rotor 1 and, as shown on FIG. 2, includes a core 5 of ferrite or other magnetic material which is high in magnetic permeability and low in coercive force Hc. The core 5 is shown to consist of two focusing portions 5a and 5b for receiving external magnetic flux and focusing the flux into saturable portions 6a and 6b which bridge the focusing portions 5a and 5b and have cross-sectional areas smaller than those of focusing portions 5a and 5b. A central hole 7 is defined between focusing portions 5a and 5b and saturable portions 6a and 6b. Primary and secondary windings or coils 8a and 8b are wound on saturable portions 6a and 6b, respectively.

Figure 3:
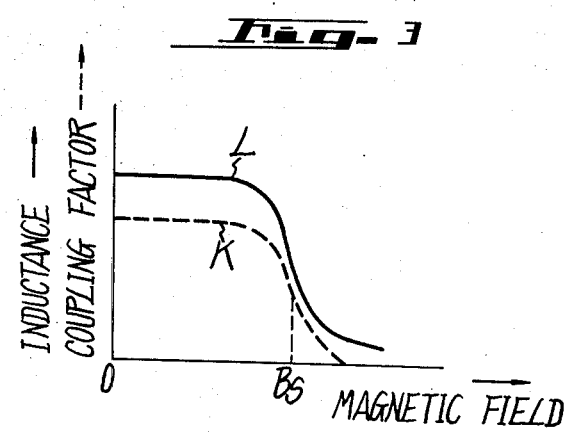
FIG. 3 is a graph to which reference will be made in explaining the operation of the saturable transformer.

With the saturable transformer 4, the inductances of windings 8a and 8b undergo a very substantial decrease in response to the application of a magnetic field to core 5 which causes saturation of portions 6a and 6b, as shown by the curve L on FIG. 3. Thus, when the flux density of the external magnetic field applied to the saturable transformer 4 exceeds a certain value $B_s$, for example, 2,000 gausses, that is, when the saturable portions 6a and 6b of the core 5 have been saturated, the inductance values of the windings 8a and 8b are very substantially reduced, for example, to from one-fifth to one-tenth of their inductance values in the absence of the external field. Further, variations in the coupling coefficient or factor of windings 8a and 8b with increases in the magnitude of the magnetic field applied to the saturable transformer 4 are indicated by the curve K on FIG. 3. Thus, when the flux density of the field applied to the saturable transformer 4 exceeds the predetermined value $B_s$, that is, when saturable portions 6a and 6b of core 5 have been saturated, the coupling coefficient or factor decreases from about 1 to 0.1 or lower.

By providing portions 5a and 5b of core 5 with cross-sectional areas that are very substantially larger than the cross-sectional areas of portions 6a and 6b, the flux received by portions 5a and 5b from an external source is focused in portions 6a and 6b so that the latter can become saturated even if the magnetic field from such external source is relatively weak.

Referring again to FIG. 1, it will be seen that primary winding 8a of transformer 4 is connected to a signal generator 9, for example, a high-frequency oscillator producing a signal with a frequency of 1 MHz, so that such signal will appear as control signals from secondary winding 8b only when portions 6a and 6b of the transformer core are substantially unsaturated. The speed detecting device according to this invention is further shown to include a switching circuit 20 which consists of two npn-type transistors 10a and 10b having their bases connected to each other and to one end of secondary winding 8b of transformer 4. Further, transistors 10a and 10b have their emitters connected to each other and to the other end of secondary winding 8b.

An alternating voltage generator 11 is provided adjacent magnet rotor 2 and generally includes a yoke 11a disposed opposite to the magnetic poles of magnet rotor 2 and a winding 11b on yoke 11a. When magnet rotor 2 rotates, magnetic flux therefrom passes through yoke 11a and induces an alternating voltage in winding 11b, which alternating voltage has its peak magnitude and phase determined by the speed and direction, respectively of the rotation of magnet rotor 2.

Figure 4:
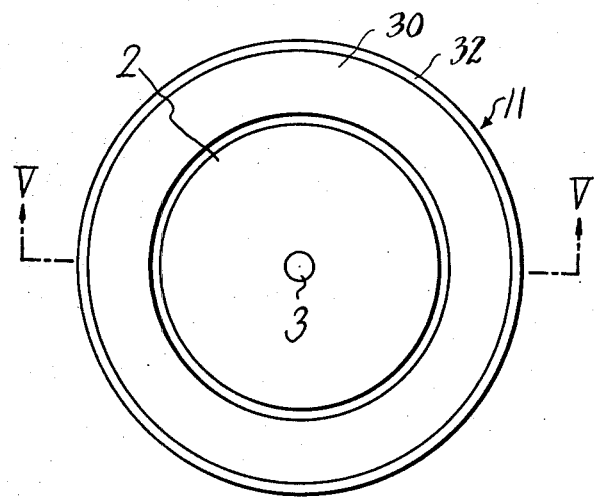
FIG. 4 is a plan view of an alternating voltage generator also included in the speed detecting device of FIG. 1.
Figure 5:
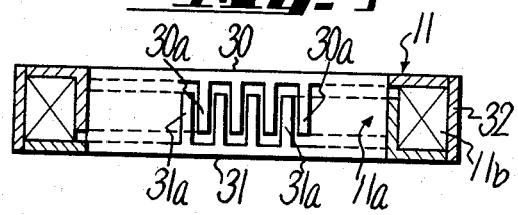
FIG. 5 is a cross-sectional view taken on the line V—V in FIG. 4, but with the magnet rotor being omitted.

As shown on FIGS. 4 and 5, the yoke 11a preferably consists of a first yoke member 30 having a plurality of spaced pole elements 30a sequentially arranged in a comb-like configuration, a second comb-like yoke member 31 similarly having a plurality of spaced pole elements 31a intermeshing with pole elements 30a and a connecting yoke member 32 interconnecting first and second yoke members 30 and 31. Yoke members 30, 31 and 32 are shaped to form an annulus which encircles the magnet rotor 2 with the pole elements 30a and 31a being located at the inner periphery of such annulus to confront the marginal portion of magnet rotor 2. Further, the circumferential spacing between adjacent pole elements 30a and 31a is made equivalent to that between adjacent N and S magnetic poles on rotor 2. Thus, where the rotor 2 has 100 pairs of N and S magnetic poles as indicated above, yoke members 30 and 31 will be provided with 100 pole elements 30a and 100 pole elements 31a, respectively. The winding 11b is housed in the annular space defined within yoke members 30, 31 and 32.

With the construction of generator 11 described above, as the north magnetic poles on rotor 2 move past pole elements 30a, the magnetic flux from each north magnetic pole of rotor 2 flows to the adjacent south magnetic pole of the rotor through the adjacent magnetic pole 30a of yoke member 30, the yoke member 32 and the adjacent magnetic pole 31a of yoke member 31, thus deriving an electric output from the winding 11b. Since many pairs of magnetic poles are provided on rotor 2 and a correspondingly large number of pole elements 30a and 31a are provided on yoke 11a, it will be apparent that the alternating voltage derived from winding 11b will have high peak magnitudes and will also have a high frequency relative to the rotational speed of rotor 2, and hence of motor shaft 3. Further, by reason of the described construction, even if the magnet rotor 2 is eccentrically located with respect to the annulus formed by yoke members 30, 31 and 32, or if there are variations in the strengths of the magnetization of rotor 2 at the various pairs of magnetic poles thereon, little or no change will occur in the output voltage from winding 11b during rotation of shaft 3.

Further, in accordance with this invention, the relative arrangements of saturable transformer 4 and generator 11 with respect to magnet rotors 1 and 2 are such that, when a maximum voltage is induced across the winding 11b of generator 11 a control signal is derived at the secondary winding 8b of transformer 4. To this end, generator 11 is arranged so that, when a north pole of magnet rotor 1 faces portion 5a of transformer core 5 each pole element 30a of generator 11 is aligned with a north magnetic pole of magnet rotor 2 and, conversely when a south pole of rotor 1 faces core portion 5a each pole element 30a also faces a south pole of rotor 2. Further, in order to ensure that a control signal will issue from secondary winding 8b of transformer 4 only when each north pole of magnet rotor 1 is adjacent core portion 5a of the transformer, the core 5 of the transformer is magnetically biased by magnetic flux which saturates core portions 6a and 6b in the direction opposed to the direction of the magnetic flux therein as a result of the proximity of a north pole on rotor 1 adjacent core portion 5a. For example, in order to achieve such magnetic biasing of transformer 4, a permanent magnet 17 may be attached to the underside of core 5, as shown on FIG. 2. The permanent magnet 17 is disposed with its north and south poles underlying the focusing portions 5b and 5a, respectively, so that the biasing magnetic flux passes through the saturable portions 6a and 6b from focusing portion 5b to focusing portion 5a. Thus, the saturable transformer 4 becomes unsaturated only when a north pole of rotor 1 faces transformer 4.

It will be apparent that the intervals between the control signals derived from secondary winding 8b of transformer 4 are determined by the speed of rotation of rotor 1 with shaft 3, that is, the frequency at which control signals or pulses are derived from secondary winding 8b is dependent on the rotational speed of magnet rotor 1. Further, it will be apparent that the frequency of the alternating voltage produced by generator 11 and also the peak magnitudes of that alternating voltage are determined by the speed of rotation of magnet rotor 2 with shaft 3, and that, with the described arrangement, for any particular rotational speed of shaft 3, the frequency at which control signals are derived from secondary winding 8b of transformer 4 is equal to the frequency of the alternating voltage produced by generator 11. It is also to be noted that, with respect to the generator 11, when shaft 3 and rotor 2 rotate in the clockwise direction as viewed on FIG. 4, the movement of each north pole of rotor 2 past a pole element 30a of yoke 11a corresponds with a peak magnitude, for example, a positive voltage peak, of the produced alternating voltage; whereas, when shaft 3 and rotor 2 rotate in the opposite or counter-clockwise direction, the movement of each north pole of rotor 2 past a pole element 30a corresponds with a negative voltage peak of the produced alternating voltage. Thus, each control signal or pulse from the secondary winding 8b of transformer 4 occurs simultaneously with a voltage peak of the alternating voltage from generator 11, which voltage peak has either positive or negative polarity in dependence upon the direction of rotation of shaft 3.

Referring again to FIG. 1, it will be seen that the winding 11b is connected, at one end, to the collector of the transistor 10a of switching circuit 20 and grounded at its other end. The collector of transistor 10b is grounded through a capacitor 12 and connected to an output terminal 14 through a resistor 13. The terminal 14 is grounded through a capacitor 15. The capacitors 12 and 15 and the resistor 13 make up a low-pass filter 21. Further, it is preferred that the value of capacitor 12 is selected to form a holding circuit. More specifically, the values Ri of the saturation resistances of the transistors 10a and 10b, the value Ro of a negative resistance connected between output terminal 14 and ground and the capacitance value C of capacitor 12 are preferably selected so that RiC<<RoC.

With an arrangement as above described, when the motor M rotates, for example, in the clockwise direction, the rotary shaft 3 also rotates clockwise and a sine-wave alternating voltage Ea shown on FIG. 6A is generated at both ends of winding 11b. Only when the saturable transformer 4 is faced by a north pole of magnet rotor 1, an output of the oscillator 9, for example, a control signal Sa of 1MHz as depicted in FIG. 6B, is derived at the output of saturable transformer 4, that is, at both ends of the secondary winding 8b thereof. Only when a control signal is derived at the output of saturable transformer 4, transistors 10a and 10b become conductive to provide, at the output of switching circuit 20, a rectangular wave voltage Ec, such as is shown on FIG. 6C, and which is produced by sampling the sine-wave alternating voltage Ea at its positive peak portion. The voltage Ec is supplied to the capacitors 12 and 15 and the resistor 13 to derive at output terminal 14 a positive DC voltage Ed, such as is depicted on FIG. 6D, due to the self maintenance or voltage holding effect of capacitor 12. Accordingly, the rotational speed of the motor M is indicated by the magnitude of the DC voltage derived at the output terminal 14, and the direction of the rotation is indicated by the fact that the DC voltage output has a positive polarity.

When motor M rotates in a reverse or counterclockwise direction, a sine-wave alternating voltage Ea', such as is shown on FIG. 6A' and which is 180° out of phase with respect to the alternating voltage Ea shown on FIG. 6A, is derived at both ends of winding 11b. The voltage Ea' is supplied to switching circuit 20 to derive at the output thereof a negative rectangular wave voltage Ec', such as is depicted on FIG. 6C', and which is produced by sampling the sine-wave voltage Ea' at each negative peak portion in response to a control signal Sa' (FIG. 6B') produced in the secondary winding 8b of saturable transformer 4. The voltage Ec' is held by capacitor 12 to provide at output terminal 14 a negative DC voltage Ed' such as is shown on FIG. 6D'. Consequently, the rotational speed of motor M in the reverse or counterclockwise direction is indicated by the magnitude of the absolute value of the negative DC voltage derived at output terminal 14.

Thus, with a speed detecting device according to this invention, as described above, it is possible to detect the direction of movement of an associated moving member from the polarity of a voltage derived at an output terminal, and also to detect the speed of such movement from the magnitude of the absolute value of the output voltage. It is also to be seen that the foregoing functions are achieved without requiring physical contact between relatively movable parts of the device, for example, between the transformer 4 and rotor 1 and between the generator 11 and rotor 2.

Referring now to FIG. 7, it will be seen that, in another embodiment of a speed detecting device according to this invention, two generators 111 and 111', each being similar to the generator 11, are provided adjacent a magnet rotor 102 to obtain a two-phase sine-wave alternating voltage. Two saturable transformers 104 and 104', each being similar to the transformer 4, are provided adjacent a magnet rotor 101 and two pairs of transistors 110a, 110b and transistors 110a', 110b' are switched by control signals derived at output sides of the saturable transformers 104 and 104'. Outputs from the transistors 110a and 110b and from the transistors 110a' and 110b' are supplied to capacitors 112 and 115 and a resistor 113 for full-wave synchronous detection, thereby to derive at an output terminal 114 a DC voltage which is twice that obtained with the device of FIG. 1 for any particular rotational speed. Multi-phase synchronous detection may also by achieved by providing three or more generators. Thus, it is possible to decrease the ripple component in the DC voltage derived at the output terminal 114.

In the above described embodiments of the invention, separate magnet rotors 1 and 2 or 101 and 102 have been mounted on a common shaft for cooperation with the saturable transformer 4 or transformers 104 and 104' and for cooperation with the alternating voltage generator 11 or generators 111 and 111'. However, it will be apparent that a single magnet rotor may be associated with the saturable transformer or transformers and with the alternating voltage generator or generators.

Figure 2:
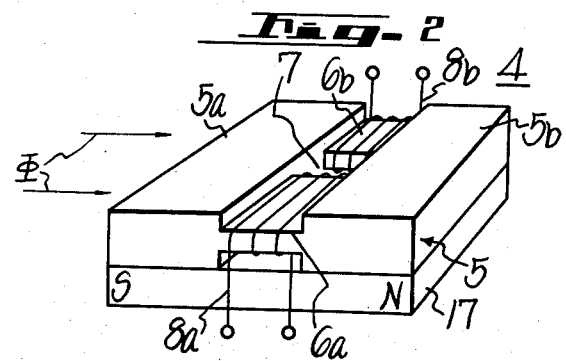
FIG. 2 is an enlarged perspective view of a saturable transformer included in the speed detecting device of FIG. 1.

Further, if desired, the saturable core 5 of transformer 4 may be magnetically biased by a DC current supplied to a suitable coil on such core rather than by the permanent magnet 17 shown on FIG. 2.

It is also to be noted that, in the described embodiments of the invention, the north and south poles on magnets 1 and 2 or 101 and 102 are in circular arrays since the movement to be detected is a rotational or rotary movement. However, if desired, a rectilinear movement may be similarly detected by providing such magnets with alternating north and south poles arranged in the direction of the rectilinear movement.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of this invention.

What is claimed is:

1. A device for detecting the speed and direction of movement of a movable member, comprising magnet means adapted to be coupled to the movable member for movement with the latter and having a plurality of magnetic poles of opposite polarities arranged alternately in the direction of movement of said magnet means with the movable member, alternating voltage generating means responsive to said movement of said magnet means for generating at least one alternating voltage having its peak magnitude and phase determined by the speed and direction, respectively, of said movement of the magnet means, signal generating means, transformer means excited by said signal generating means and being responsive to magnetic flux from said magnet means for producing intermittent control signals occurring at intervals determined by said speed of movement of said magnet means, and circuit means controlled by said control signals and receiving said alternating voltage for sampling the latter at the occurrences of said control signals and providing a D.C. output voltage corresponding in its magnitude and polarity to said speed and direction, respectively, of said movement of the magnet means.

2. A device according to claim 1, in which said transformer means includes a core disposed to receive said magnetic flux from said magnet means and primary and secondary windings on said core and being substantially coupled with each other through said core only when a pole of one of said polarities on said magnet means is disposed adjacent said core, said primary winding is connected with said signal generating means and said control signals are produced in said secondary winding in response to the substantial coupling of the latter with said primary winding through said core.

3. A device according to claim 2, in which said core of the transformer means includes saturable portions having said windings thereon and which are rendered unsaturated by said magnetic flux from said magnet means only when each said pole of said one polarity is disposed adjacent said core.

4. A device according to claim 3, in which said core further includes focusing portions coupled with said saturable portions and having substantially greater cross-sectional areas than the latter for receiving said magnetic flux from said magnet means and relatively increasing the density of said flux in said saturable portions.

5. A device according to claim 3, in which said transformer means further includes means producing a unidirectional magnetic field for saturating said saturable portions of the core and which is opposed by said magnetic flux from said magnet means when each said pole of said one polarity is adjacent said core.

6. A device according to claim 5, in which said means producing said magnetic field for saturating said saturable portions of the core includes permanent magnet means coupled with said core.

7. A device according to claim 1, in which said circuit means includes switching circuit means receiving said alternating voltage and being switched on by said control signals, and said transformer means is disposed relative to said magnet means for producing said control signals in synchronism with the voltage peaks of said alternating voltage so that said switching circuit means selectively samples the positive and negative peak voltages of said alternating voltage in dependence on the direction of movement of said magnet means.

8. A device according to claim 7, in which said circuit means further includes holding means receiving the output of said switching circuit means and providing said D.C. output voltage substantially at the peak voltage sampled by said switching circuit means.

9. A device according to claim 8, in which said holding means includes a capacitor charged by said peak voltage sampled by said switching circuit means.

10. A device according to claim 7, in which said transformer means includes a core disposed to receive said magnetic flux from said magnet means and primary and secondary windings on said core and being substantially coupled with each other through said core only when a pole of one of said polarities on said magnet means is disposed adjacent said core, said primary winding is connected with said signal generating means and said control signals are produced in said secondary winding in response to substantial coupling of the latter with said primary winding through said core.

11. A device according to claim 10, in which said switching circuit means includes two transistors each having first, second and third electrodes, means connecting said first electrodes of said two transistors to each other and to one end of said secondary winding, means connecting said second electrodes of said two transistors to each other and to the other end of said secondary winding, and means connecting said third electrode of one of said transistors to said alternating voltage generating means so that the sampled peak voltages of said alternating voltage appear at said third electrode of the other of said transistors.

12. A device according to claim 1, in which said alternating voltage generating means includes a yoke assembly having a plurality of pole elements arranged along said magnet means with spacing between said pole elements corresponding to that between said magnetic poles on said magnet means, and a coil wound on said yoke assembly to have said alternating voltage induced in said coil.

13. A device according to claim 12, in which said yoke assembly includes two comb-like portions arranged in interfitting relation to define said pole elements.

14. A device according to claim 13, in which said magnet means is in the form of a rotary disc having said magnetic poles spaced apart along the periphery of said disc, and said yoke assembly is annular and extends about said disc with said comb-like portions of the yoke assembly constituting the inner periphery of the latter.

15. A device according to claim 1, in which said magnet means includes at least one rotary disc having said magnetic poles spaced apart along the periphery of said disc.

16. A device according to claim 1, in which said alternating voltage generating means includes at least first and second alternating voltage generators each responsive to the movement of said magnet means for providing alternating voltages with at least two phases, said transformer means includes at least first and second transformers each excited by said signal generating means and being responsive to magnetic flux from said magnet means for producing respective intermittent control signals, and said circuit means is controlled by said control signals from said first and second transformers for synchronously detecting respective phases of said alternating voltages.

* * * * *